US006640044B2

(12) United States Patent
Greenwood et al.

(10) Patent No.: US 6,640,044 B2
(45) Date of Patent: Oct. 28, 2003

(54) EDITING OF RECORDED MATERIAL USING A VIRTUAL FILE REPRESENTING AN EDITED CLIP SEQUENCE

(75) Inventors: Jonathan Mark Greenwood, Basingstoke (GB); Mark John McGrath, Bracknell (GB)

(73) Assignees: Sony Corporation, Tokyo (JP); Sony United Kingdom Limited, Weybridge (GB)

( * ) Notice: Subject to any disclaimer, the term of this patent is extended or adjusted under 35 U.S.C. 154(b) by 0 days.

(21) Appl. No.: 08/833,719

(22) Filed: Apr. 9, 1997

(65) Prior Publication Data

US 2003/0077066 A1 Apr. 24, 2003

(30) Foreign Application Priority Data

Apr. 12, 1996 (GB) ................................ 6907693

(51) Int. Cl.[7] .......................... H04N 5/93; G11B 27/00
(52) U.S. Cl. ........................ 386/52; 386/55; 345/723
(58) Field of Search ........................... 386/52, 54, 55, 386/60, 125; 360/13; 345/328, 723; H04B 5/93; G11B 27/00

(56) References Cited

U.S. PATENT DOCUMENTS

| 4,932,016 A | | 6/1990 | Yoshida et al. | |
|---|---|---|---|---|
| 5,012,334 A | | 4/1991 | Etra | |
| 5,164,839 A | * | 11/1992 | Lang | 358/335 |
| 5,218,672 A | * | 6/1993 | Morgan et al. | 395/162 |
| 5,237,648 A | * | 8/1993 | Mills et al. | 395/133 |
| 5,263,160 A | * | 11/1993 | Porter, Jr. et al. | 707/3 |
| 5,367,341 A | * | 11/1994 | Schnorf | 348/616 |
| 5,388,197 A | * | 2/1995 | Rayner | 395/154 |
| 5,469,270 A | * | 11/1995 | Yamamoto | 358/335 |
| 5,471,452 A | | 11/1995 | Kishi | |
| 5,568,275 A | * | 10/1996 | Norton et al. | 386/52 |
| 5,602,684 A | * | 2/1997 | Corbitt et al. | 386/52 |

FOREIGN PATENT DOCUMENTS

| EP | 0 377 340 | 7/1990 |
|---|---|---|
| EP | 0 399 853 | 11/1990 |
| EP | 0 438 299 A2 | 7/1991 |
| EP | 0 592 250 A2 | 4/1994 |
| EP | 0 599607 A1 | 6/1994 |
| EP | 0 684 570 | 11/1995 |
| EP | 0 687 109 A1 | 12/1995 |
| GB | 2273220 A | 6/1994 |
| JP | 09-147530 | 11/1995 |
| WO | WO 93/10321 | 5/1993 |
| WO | WO 93/21636 | 10/1993 |

OTHER PUBLICATIONS

T. Yoshida, "*The Rewritable Minidisc system*" Proceedings of the IEEE, USA vol. 92, No. 10, pp. 1492–1500, Oct. 1994.

(List continued on next page.)

*Primary Examiner*—Vincent Boccio
(74) *Attorney, Agent, or Firm*—Frommer Lawrence & Haug LLP; William S. Frommer; Glenn F. Savit (57) ABSTRACT

Editing apparatus for editing source video and/or audio material stored on a storage medium to generate an edited material sequence of clips from the source material, comprises: means for defining source files on the storage medium containing data representing the source material to be edited; and means for defining an output file on the storage medium for each edited material sequence, each output file comprising addressing information defining a sequence of storage locations on the storage medium of data within the source files representing the one or more clips of source material forming that edited material sequence.

6 Claims, 11 Drawing Sheets

| LBA | OFFSET | #BYTES | #LBS | DATA |
|---|---|---|---|---|
| 32 | | | 1 | DISK HEADER |
| 33 | | 32 | 1 | REAL FILE MASK |
| 34 | | | 2 | REAL FILE NAME TABLE (RFNT) |
| 36 | | | 16 | REAL FILE HEADER TABLE (RFHT) |
| 52 | | 32 | 1 | VIRTUAL FILE MASK |
| 53 | | | 2 | VIRTUAL FILE NAME TABLE (VFNT) |
| 55 | | | 16 | VIRTUAL FILE HEADER TABLE (VFHT) |
| 71 | | | 64 | ROUTE MAP (RM) |
| 135 | | 1024 | 1 | VET MASK |
| 136 | | | 64 | VIDEO EDIT TABLE (VET) |
| 200 | | 1024 | 1 | AET MASK |
| 201 | | | 64 | AUDIO EDIT TABLE (AET) |
| 265 | | | 23 | UNUSED |

OTHER PUBLICATIONS

Duncan R: "Design of Goals and Implementation of the New High Performance File System" Microsoft Systems Journal, Sep. 1, 1989, pp. 1–13, XP000748391.

Renesse Van R et al: "The Design of a High–Performanve File Server" International conference on Distributed Computing Systems, Newport Beach, Jun. 5–9, 1989, No. Conf. 9, Jun. 5, 1989, pp. 22–27, XP000044023 Institute of Electrical and Electronics Engineers.

Davis A W et al: "The Mac Goes to the Movies" Byte, vol. 18, No. 2, Feb. 1, 1993, pp. 225–228, 230, XP000334309.

Venkat Rangan P et al: "Designing File Systems for Digital Video and Audio" Operating Systems Review (Sigops), vol. 25, No. 5, Jan. 1, 1991, pp. 81–94, XP000288304.

Hoffert E eta l: "Quick Timetm: An Extensible Standard for Digital Multimedia" Intellectual Leverage, San Francisco, Feb. 24–28, 1992. No. Conf. 37, Feb. 24, 1992. pp. 15–20, XP000490992 Institute of Electrical and Electronics Engineers.

Nowara T: "Halzbeit in der Digitalen Nonlinearen Nachbearbeitung. Praxisnahe Betrachtungen und Systemuberblick" Fernesh und Kinotechnik, vol. 49, No. 12, Dec. 1, 1995, pp. 715–720, 722–772, XP000545308.

* cited by examiner

FIG. 2

| LBA | OFFSET | #BYTES | #LBS | DATA |
| --- | --- | --- | --- | --- |
| 32 | | | 1 | DISK HEADER |
| 33 | | 32 | 1 | REAL FILE MASK |
| 34 | | | 2 | REAL FILE NAME TABLE (RFNT) |
| 36 | | | 16 | REAL FILE HEADER TABLE (RFHT) |
| 52 | | 32 | 1 | VIRTUAL FILE MASK |
| 53 | | | 2 | VIRTUAL FILE NAME TABLE (VFNT) |
| 55 | | | 16 | VIRTUAL FILE HEADER TABLE (VFHT) |
| 71 | | | 64 | ROUTE MAP (RM) |
| 135 | | 1024 | 1 | VET MASK |
| 136 | | | 64 | VIDEO EDIT TABLE (VET) |
| 200 | | 1024 | 1 | AET MASK |
| 201 | | | 64 | AUDIO EDIT TABLE (AET) |
| 265 | | | 23 | UNUSED |

FIG. 4

| RECORD INDEX | # BYTES | 7 | 6 | 5 | 4 | 3 | 2 | 1 | 0 |
| --- | --- | --- | --- | --- | --- | --- | --- | --- | --- |
| 0 | 16 | - UNUSED - ||||||||
| 1 | 16 | FILENAME (15+1 CHARS) ||||||||
| 2 | 16 | FILENAME (15+1 CHARS) ||||||||
| 3... | | etc ||||||||

FIG. 6

| BIT / BYTE | # BYTES | 7 | 6 | 5 | 4 | 3 | 2 | 1 | 0 |
|---|---|---|---|---|---|---|---|---|---|
| | 33 | FORMAT ID e.g. 'DNE-50' (32+1 CHARS) | | | | | | | |
| | 33 | FORMAT VERSION e.g. 'V1.01' (32+1 CHARS) | | | | | | | |
| | 33 | PC SOFTWARE VERSION e.g. 'V1.02' (32+1 CHARS) | | | | | | | |
| | 33 | EMBEDDED FIRMWARE VERSION e.g. 'V1.02' (32+1 CHARS) | | | | | | | |
| | 33 | DISK VOLUME LABEL (32+1 CHARS) | | | | | | | |
| | 1 | NUMBER OF REAL FILES ON DISK | | | | | | | |
| | 1 | NUMBER OF VIRTUAL FILES ON DISK | | | | | | | |
| | 2 | NUMBER OF FRAGMENTS ON DISK (ROUTE MAP ENTRIES) | | | | | | | |
| | 2 | START OF FREE SPACE (ROUTE MAP INDEX) | | | | | | | |
| | 2 | END OF FREE SPACE (ROUTE MAP INDEX) | | | | | | | |
| | 1 | - UNUSED - | | | | | | | LINE STANDARD |
| ..2047 | | - UNUSED - | | | | | | | |

FIG. 5

| BIT / BYTE | 7 | 6 | 5 | 4 | 3 | 2 | 1 | 0 | # BYTES |
|---|---|---|---|---|---|---|---|---|---|
| | FILE NAME (15+1 CHARS) ||||||||  16 |
| | CREATION DATE 'DD/MM/YYYY' (10+1 CHARS) ||||||||  11 |
| | CREATION TIME 'HH:MM:SS' (8+1 CHARS) ||||||||  9 |
| | TIMECODE START ||||||||  4 |
| | NUMBER OF FRAMES ||||||||  4 |
| | NUMBER OF FRAGMENTS ||||||||  2 |
| | FIRST ENTRY IN ROUTE MAP (ROUTE MAP INDEX) ||||||||  2 |
| | LAST ENTRY IN ROUTE MAP (ROUTE MAP INDEX) ||||||||  2 |
| | NOTES (63+1 CHARS) ||||||||  64 |
| | HEAD PICTURE FRAME ||||||||  4 |
| | TAIL PICTURE FRAME ||||||||  4 |
| | CH 4 | CH 3 | CH 2 | CH 1 ||||| 1 |
| | UNUSED (PAD TO 128 BYTES / HEADER) ||||||||  5 |
| | NEXT FILE HEADER RECORD |||||||| |

{ 1 RECORD (rows above NEXT FILE HEADER RECORD) }

FIG. 7

| BIT / BYTE | # BYTES | 7 | 6 | 5 | 4 | 3 | 2 | 1 | 0 |
|---|---|---|---|---|---|---|---|---|---|
| | 16 | FILE NAME (15+1 CHARS) | | | | | | | |
| | 11 | CREATION DATE 'DD/MM/YYYY' (10+1 CHARS) | | | | | | | |
| | 9 | CREATION TIME 'HH:MM:SS' (8+1 CHARS) | | | | | | | |
| | 4 | TIMER PRESET | | | | | | | |
| | 4 | NUMBER OF FRAMES | | | | | | | |
| | 2 | NUMBER OF ENTRIES IN VET | | | | | | | |
| | 2 | FIRST ENTRY IN VET (VIDEO EDIT TABLE INDEX) | | | | | | | |
| | 2 | NUMBER OF ENTRIES IN AET | | | | | | | |
| | 2 | FIRST ENTRY IN AET (AUDIO EDIT TABLE INDEX) | | | | | | | |
| | 64 | NOTES (63+1 CHARS) | | | | | | | |
| | 4 | HEAD PICTURE FRAME | | | | | | | |
| | 4 | TAIL PICTURE FRAME | | | | | | | |
| | 1 | | | | | | CH 4 | CH 3 | CH 2 | CH 1 |
| | 3 | UNUSED (PAD TO 128 BYTES / HEADER) | | | | | | | |
| | | NEXT FILE HEADER RECORD | | | | | | | |

{ 1 RECORD

FIG. 8

| BIT /<br>BYTE | #<br>BYTES | 7 | 6 | 5 | 4 | 3 | 2 | 1 | 0 |
|---|---|---|---|---|---|---|---|---|---|
| | 4 | colspan="8" | PACKET NUMBER OF START FRAGMENT #1 (PACKET NUMBER) |||||||
| | 4 | colspan="8" | LENGTH OF FRAGMENT #1 (#FRAMES) |||||||
| | 2 | colspan="8" | NEXT ROUTE MAP RECORD (ROUTE MAP INDEX) |||||||
| | 6 | colspan="8" | UNUSED |||||||
| | 4 | colspan="8" | PACKET NUMBER OF START FRAGMENT #2 (PACKET NUMBER) |||||||
| | 4 | colspan="8" | LENGTH OF FRAGMENT #2 (#FRAMES) |||||||
| | 2 | colspan="8" | NEXT ROUTE MAP RECORD (ROUTE MAP INDEX) |||||||
| | 6 | colspan="8" | UNUSED |||||||
| | | colspan="8" | etc.... |||||||

FIG. 9

| BIT /<br>BYTE | #<br>BYTES | 7 | 6 | 5 | 4 | 3 | 2 | 1 | 0 |
|---|---|---|---|---|---|---|---|---|---|
| | 1 | colspan="8" | REAL FILE NUMBER |||||||
| | 2 | colspan="8" | START IN THE ROUTE MAP (ROUTE MAP INDEX) |||||||
| | 4 | colspan="8" | OFFSET FROM START (FRAMES) |||||||
| | 4 | colspan="8" | LENGTH (FRAMES) |||||||
| | 2 | colspan="8" | NEXT VET RECORD (VIDEO EDIT TABLE) |||||||
| | 3 | colspan="8" | - UNUSED - |||||||
| | | colspan="8" | etc... |||||||

FIG. 10

| BIT / BYTE | # BYTES | 7 | 6 | 5 | 4 | 3 | 2 | 1 | 0 |
|---|---|---|---|---|---|---|---|---|---|
| | 1 | REAL FILE NUMBER ||||||||
| | 2 | START IN THE ROUTE MAP (ROUTE MAP INDEX) ||||||||
| | 4 | OFFSET FROM START (FRAMES) ||||||||
| | 4 | LENGTH (FRAMES) ||||||||
| | 2 | NEXT AET RECORD (AUDIO EDIT TABLE) ||||||||
| | | CHANNEL 4 LEFT | CHANNEL 3 LEFT | CHANNEL 2 LEFT | CHANNEL 1 LEFT | CHANNEL 4 RIGHT | CHANNEL 3 RIGHT | CHANNEL 2 RIGHT | CHANNEL 1 RIGHT |
| | 2 | - UNUSED - ||||||||
| | | etc... ||||||||

FIG. 11

| BIT / BYTE | # BYTES | 7 | 6 | 5 | 4 | 3 | 2 | 1 | 0 |
|---|---|---|---|---|---|---|---|---|---|
| | 1 | HEADER ||||||||
| | 32 | TIMECODE ||||||||
| | 1 | CH1 BIT 11 | CH1 BIT 10 | CH1 BIT 9 | CH1 BIT 8 | CH1 BIT 7 | CH1 BIT 6 | CH1 BIT 5 | CH1 BIT 4 |
| | 1 | CH1 BIT 3 | CH1 BIT 2 | CH1 BIT 1 | CH1 BIT 0 | CH2 BIT 11 | .... | .... | .... |
| | 1 | .... | .... | .... | .... | .... | .... | .... | CH2 BIT 0 |
| | 1 | CH3 BIT 11 | .... | .... | .... | .... | .... | .... | .... |
| | 1 | .... | .... | .... | CH3 BIT 0 | CH4 BIT 11 | .... | .... | .... |
| | 1 | .... | .... | .... | .... | .... | .... | .... | CH4 BIT 0 |
| | . | OTHER AUDIO SAMPLES ||||||||
| | .. | - UNUSED - ||||||||
| | | NEXT FRAME ||||||||

| BIT /<br>BYTE | #<br>BYTES | 7 | 6 | 5 | 4 | 3 | 2 | 1 | 0 |
|---|---|---|---|---|---|---|---|---|---|
| | 2 | HEADER |||||||||
| | 32 | TIMECODE |||||||||
| | . | VIDEO DATA COMPRESSED AND DECIMATED |||||||||
| | | NEXT FRAME / PACKET |||||||||

EDITING OF RECORDED MATERIAL USING A VIRTUAL FILE REPRESENTING AN EDITED CLIP SEQUENCE

BACKGROUND OF THE INVENTION

1. Field of the Invention

This invention relates to the editing of recorded material such as audio and/or video material.

2. Description of the Prior Art

As an example, video edit controllers are used to edit a number of "raw" source video sequences into a final programme or part of a programme. For example, a short news story may contain brief excerpts of a number of different video sequences, possibly including newly captured and older, archived sequences, in order to illustrate different aspects of the news story. A relevant portion or "clip" of each sequence needs to be selected, and the selected portions linked together to form the composite output sequence.

Recently, computer-based non-linear edit controllers have become available. These allow a user to view the source sequences on a computer screen and to select an "in-point" and an "out-point" for each required sequence or clip using the computer keyboard or a cursor control device such as a mouse, joystick or trackerball. The selected clips can then be ordered to form the desired output sequence.

In such a computer-based system, it has been proposed to load the required source sequences from the usual tape medium onto a random access storage device such as a hard disk or magneto-optical disk associated with the computer before editing takes place. This allows the user to view different sequences in very quick succession, without the delays normally associated with tape media such as the need to change tapes or to shuttle to a different part of the same tape.

SUMMARY OF THE INVENTION

This invention provides editing apparatus for editing source video and/or audio material stored on a storage medium to generate an edited material sequence of clips from the source material, the apparatus comprising:

means for defining source files on the storage medium containing data representing the source material to be edited; and means for defining an output file on the storage medium for each edited material sequence, each output file comprising addressing information defining a sequence of storage locations on the storage medium of data within the source files representing the one or more clips of source material forming that edited material sequence.

The invention recognises that in an editing system based on a random access storage medium such as a disk drive, it has previously been a complex and processor-intensive operation to replay an edited sequence containing clips from multiple source material files. In particular, in such a previous system, each source file has to be opened in turn (and generally in advance of the time when it is needed), the clip of material has to read from that source file, and then the source file has to be closed. This type of sequential operation has been referred to as "time line" based operation, and works well in a normal speed, forward direction replay. However, it does not lend itself to more unusual replay operations, such as reverse, jog or shuttle replay, nor to replay starting at an arbitrary point within the sequence.

The invention provides a new way of organising the stored data for an edited output sequence, by creating what will be referred to as an output or "virtual" file representing the output sequence. This is a file on the storage device with no dedicated material data, but simply having a sequence of pointers to sections of stored data relating to "real" (or source) files.

Thus, in order to replay the virtual file, the sequence of pointers is followed through in order to access the required data from sections of the disk. In at least embodiments of the invention, this uses the same techniques that are employed to cope with disk fragmentation for real files. However, in contrast to the "time-line" operation mentioned above, the virtual file can be replayed in either direction and from arbitrary starting points within the file.

This invention also provides a data storage medium for storing source video and/or audio material, edited to form an edited material sequence of clips from the source material, the data storage medium storing:

source files containing data representing the source material to be edited; and an output file for each edited material sequence, each output file comprising addressing information defining a sequence of storage locations on the storage medium of data within the source files representing the one or more clips of source material forming that edited material sequence.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
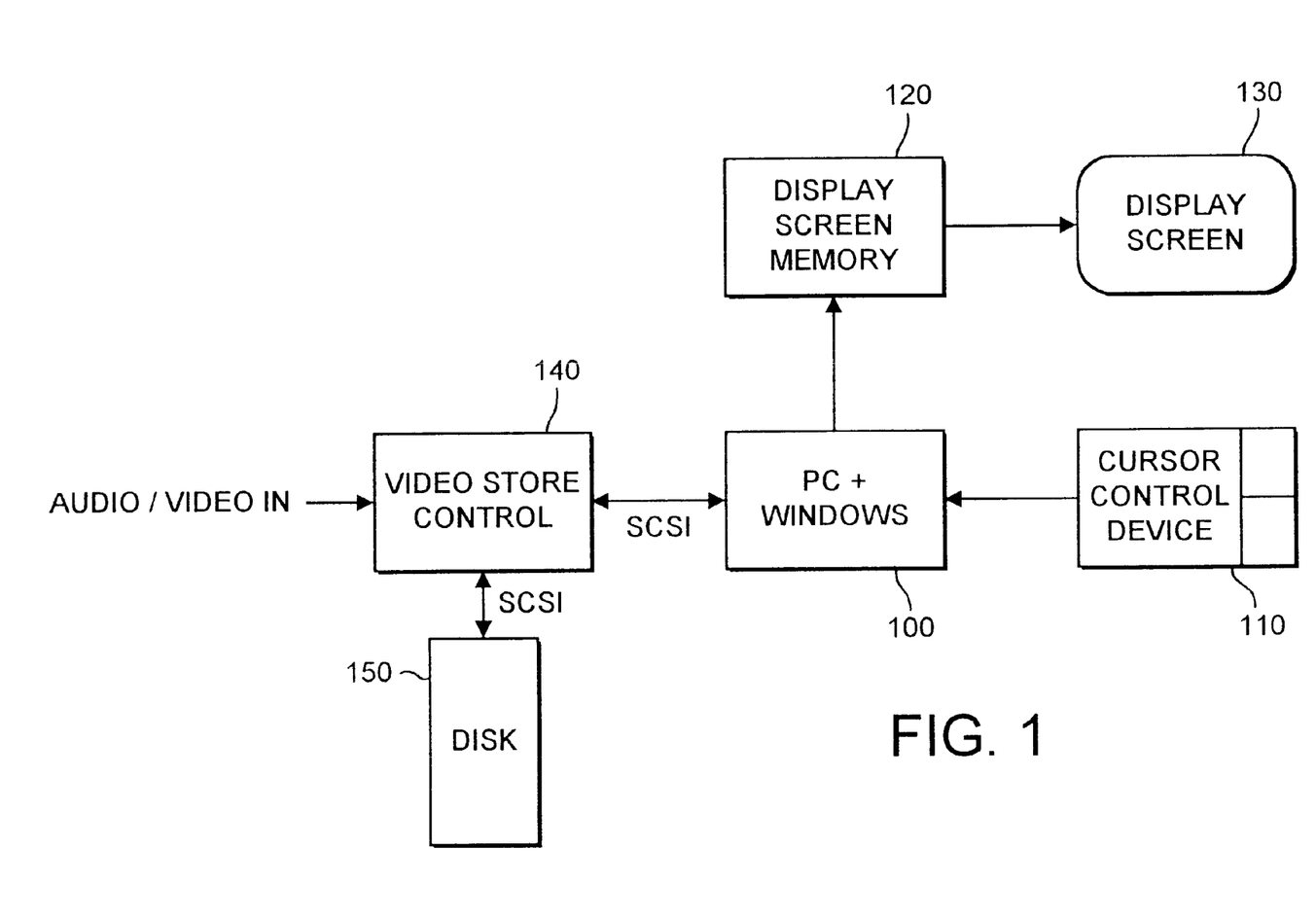
FIG. 1 is a schematic diagram of a digital video editing system.

FIG. 1 is a schematic block diagram of a digital video editing system and associated video storage apparatus.

The system comprises a personal computer (PC) 100, the PC having a cursor control device 110 (e.g. a mouse), a display screen memory 120 and a display screen 130. The PC in the present embodiment is a notebook (portable) computer, the IBM "Thinkpad", in which the PC 100, the cursor control device 110, the display screen memory 120 and the display screen (an LCD screen) are all incorporated into a single portable unit. (In actual fact, the cursor control device 110 in the IBM Thinkpad is a joystick control device). Thus, data communication between the PC and its constituent parts is via the PC's internal buses.

The PC 100 communicates with a video store controller 140 via a SCSI bus, and the video store controller 140 also communicates with a magneto-optical disk 150 via a SCSI bus.

In the present embodiment, the video store controller 140 and the magneto-optical disk 150 are fabricated as a "docking station" on which the notebook computer may sit in use.

The editing system is intended to operate as an off-line non-linear edit controller, in which incoming broadcast quality audio and video signals are subjected to very heavy data compression (to a level well below broadcast standard) and are stored on the magneto-optical disk 150. When one or more sections of source video have been stored on the magneto-optical disk 150, they can be manipulated by the user operating the edit controller to generate an edit decision list (EDL) which is a list of video time codes defining "in-points" and "out-points" of the source material to form successive portions of an output edited video sequence. However, because the video signal stored on the disk 150 are well below broadcast standard, the intention is that the EDL is then exported to be applied to the original video data (as originally supplied to the video store controller 140) for broadcast or distribution.

Figure 2:
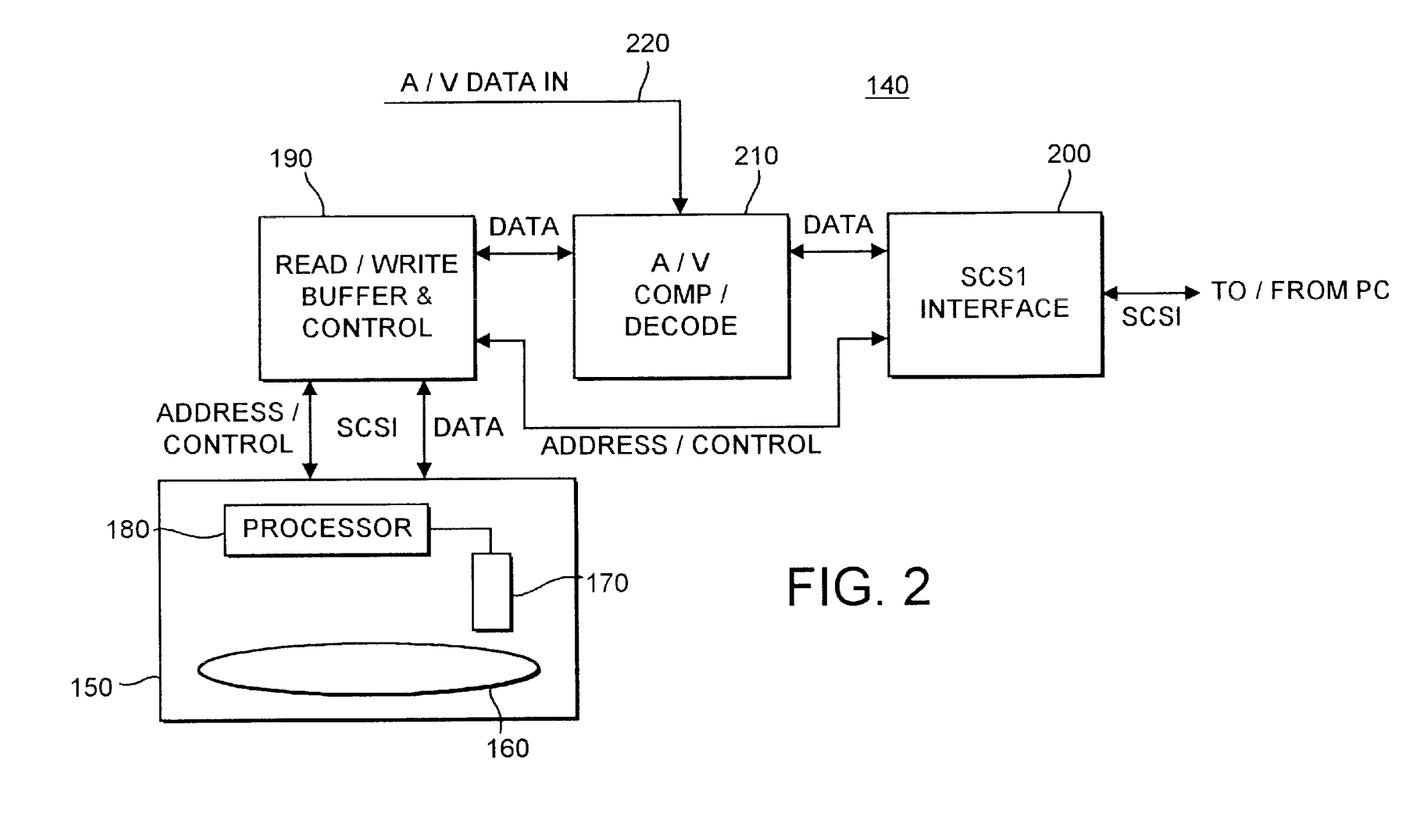
FIG. 2 is a schematic diagram of a video store controller.

FIG. 2 is a schematic diagram of the video store controller 140 and the magneto-optical disk 150.

The magneto-optical disk 150 is a self-contained unit with a removable disk medium 160, containing the read/write heads and associated circuitry 170, and a processor 180 which attends to the very low-level formatting and data handling on the disk. An example of such a product is the Sony HSD-650 magneto-optical disk drive. With this device, the disk 150 is supplied (from external circuitry) with a "logical block address" (LBA) defining one of a large number of logical data blocks (LBs) on the disk. The actual positioning and formatting of the blocks on the disk medium 160 is left to the processor 180, so that the disk 150 appears to the outside as a large (in this case, 652 Megabytes) storage medium on which small blocks of storage are individually addressable by the LBAs. The disk 150 communicates with a read/write buffer and control circuit 190 via a SCSI link.

A SCSI interface 200 is provided for communication to and from the notebook PC, and an audio/video (A/V) compression/decompression circuit 210 is provided to compress audio and video data to be written to the magneto-optical disk 150 and to decompress audio and video data which is read from the magneto-optical disk 150. The A/V compressor/decompressor 210 uses known intra-picture compression techniques so that individual pictures can be recovered from the disk without reference to other compressed pictures. Specifically, incoming broadcast quality pictures supplied on an input port 220 are subject to decimation by a factor of about 4:1 horizontally and vertically, and the resulting decimated pictures are compressed using known JPEG compression techniques to produce compressed picture data of about 5 kilobytes per picture. When the pictures are subsequently read from the magneto-optical disk 150, they are subjected only to the JPEG decompression, so that the pictures supplied to the PC for display are of a much smaller (4:1 decimated) size than full-rate video pictures. However, this is not a handicap in this case because the pictures are only to be used for assessing where to make edit decisions; the edit decisions are subsequently applied back (via the EDLs) to the original (uncompressed) video signals.

Although it would be possible for program firmware associated with the read/write buffer and control circuit 190 to handle some of the formatting of audio and video data stored on the disk 150, in fact in the present embodiment this is all handled by the PC 100. Thus, the video store controller 140 is set up to act as a rather "dumb" store controller, which reads or writes data to the disk 150 as directed (at the level of a signal LB address) by the PC 100.

In order to initiate a replay of video data from the magneto-optical disk, the PC 100 downloads to the video store controller an ordered list of LBs to replayed. The video frames stored at these LBs are replayed, decompressed and supplied back to the PC for display in that order. Having said this, the PC will often need to access data stored in the header area of the magneto-optical disk to derive the list of LBs to be sent to the video store controller.

Thus, the way in which data is written to the magneto-optical disk defines many features of the operation of this embodiment, and so the disk organisation will be described in detail below.

Figure 3A:
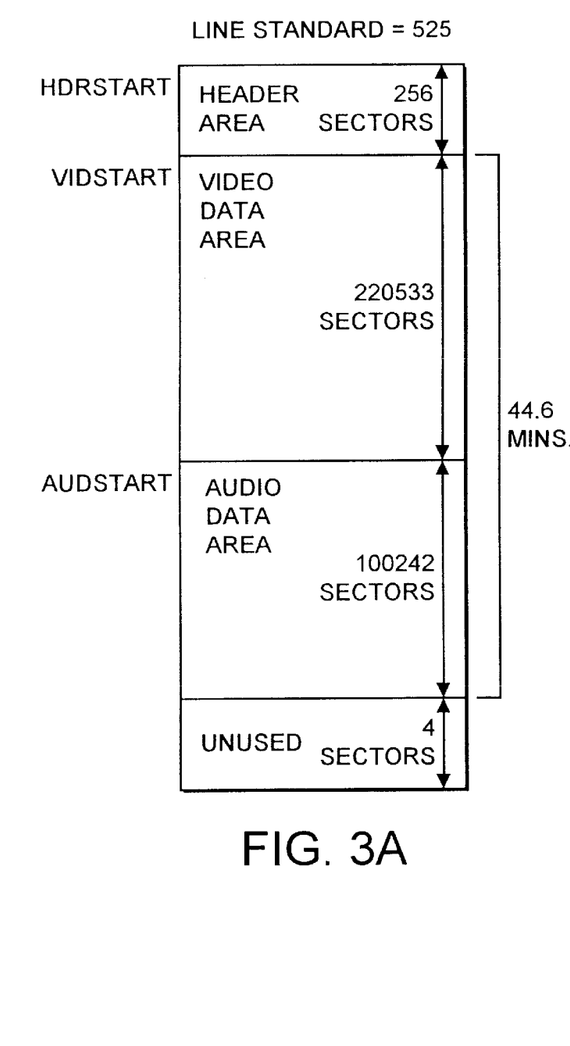
FIGS. 3a and 3b schematically illustrate the organisation of data on a disk medium for 525-line standard video and 625-line standard video respectively.
Figure 3B:
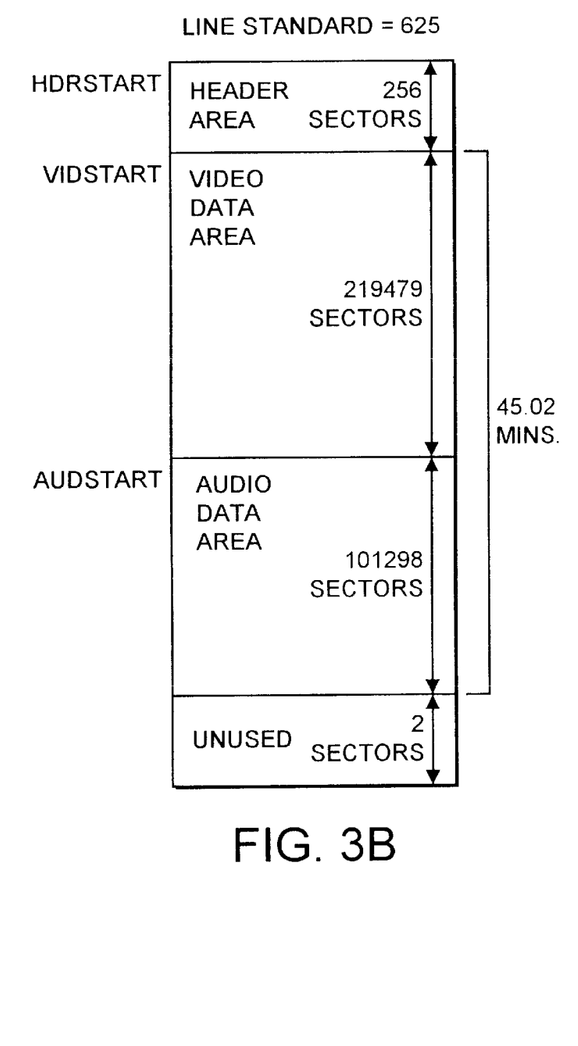

By way of introduction, FIGS. 3a and 3b schematically illustrate the organisation of data on a disk medium 160 for 525-line standard video and 625-line standard video.

Basically, the disk in each case is divided into a header area, followed by a video data area, followed by an audio data area, followed by a few unused sectors (logical blocks), each sector being 2048 bytes of data. The compression applied to the video and audio data is adjusted for the two line standards so that about 44 to 45 minutes of video and audio material can fit onto a single disk medium.

The header area, video data area and audio data are will be described in detail with reference to FIGS. 4 to 15 below. Importantly, it is repeated that these areas are formatted in terms of logical block addresses, with the very low level formatting being handled by the disk drive itself. The LB-level formatting is handled by the PC under software control.

Figure 4:
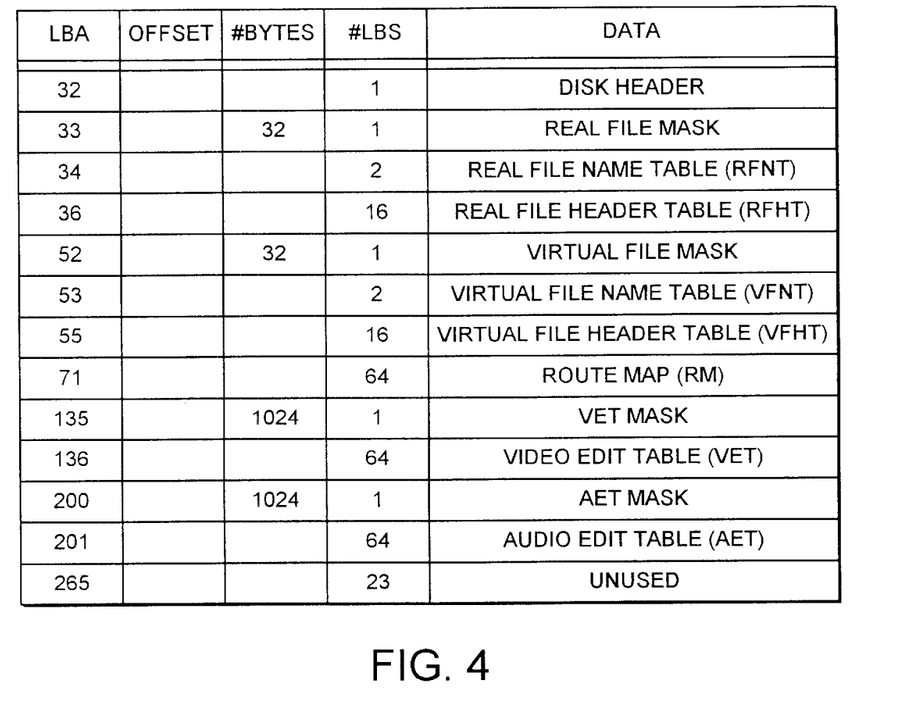
FIG. 4 is a schematic table showing the contents of a disk header area.

FIG. 4 is a schematic diagram showing the content of the disk header area of a disk medium.

The header area is 256 sectors (LBs) long, and comprises the following portions:

| | |
|---|---|
| Disk header: | 1 logical block |
| Real file mask: | 1 logical block |
| Real file name table: | 2 logical blocks |
| Real file header table: | 16 logical blocks |
| Virtual file mask: | 1 logical block |
| Virtual file name table: | 2 logical blocks |
| Virtual file header table: | 16 logical blocks |
| Route Map: | 64 logical blocks |
| Video Edit Table Mask: | 1 logical block |
| Video Edit Table: | 64 logical blocks |
| Audio Edit Table Mask: | 1 logical block |
| Audio Edit Table: | 64 logical blocks |

Each of these portions will be described in greater detail below.

Figure 5:
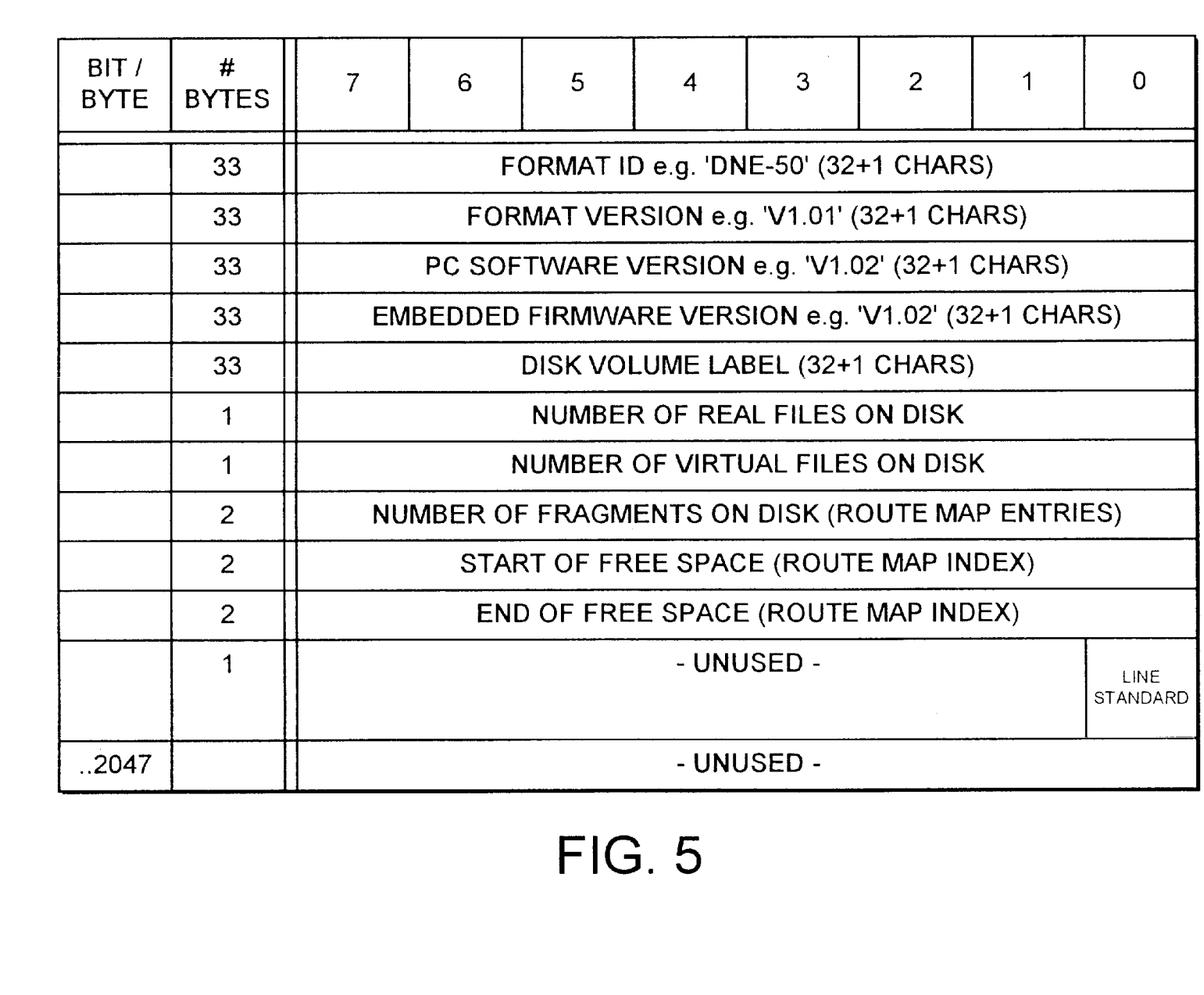
FIG. 5 is a schematic table showing the contents of a disk header file.

The disk header file is shown in more detail in FIG. 5. Most of the parts of the disk header file are fairly selfexplanatory. This file is written when the disk is originally formatted (under PC control), and so contains identification data of the software used, a volume label, data giving the number of real files and "virtual files" on the disk (real files and virtual files will be described below) and data defining the route map (also to be defined below). Finally, one bit is reserved to indicate the line standard of the video data recorded on the disk. A single disk medium 160 is constrained to have either 525-line standard video or 625-line standard video stored on it; there cannot be a mixture of different video line standards on a single disk medium in this particular embodiment.

The maximum number of data files which can be stored on the disk medium is defined in advance by reserving space for a table of the file names and a table of the file headers. In the present embodiment, the maximum number of files is 255 real files and 255 virtual files.

A "real" file is created when audio/video data is recorded from the input port 220 onto a disk medium 160. The real file consists of a file name, a file header and areas of stored data on the disk medium 160. The location of the stored data on the disk medium is defined (in terms of LBAs) by the file header. Once a real file has been recorded, it is not changed by an editing operation; it can simply be maintained in its existing form or deleted from the disk.

In contrast, a virtual file is created by an editing operation, and consists of a file name and a file header pointing to a video edit table only. The virtual file does not have a permanent association with particular data on a disk, but instead provides, indirectly, a series of pointers to sections of the data contained in one or more real files stored on the disk.

This arrangement actually saves a lot of disk space, by not having to store data twice during an editing operation. For example, if there are three real files stored on the disk and an operator wishes to define an edited output video sequence comprising, say, 10 seconds from each of the three real files, there is no need to physically copy those portions of the real files into a new output file. Instead, a virtual file is defined which provides pointers to the selected portions within each of the real files. In actual fact, since the header area for the virtual files is reserved in advance, creation of a virtual file actually takes up no additional disk space.

A file name table is provided in the header area for real files, and another similar table for virtual files. These are identical in form, and an example is illustrated schematically in FIG. 6.

Figure 6:
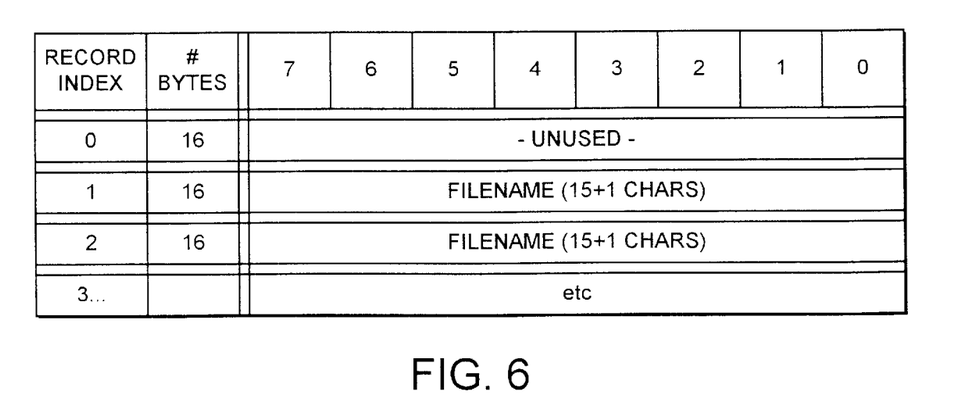
FIG. 6 is a schematic diagram of a file name table.

The file name tables comprise a list of file names (up to 16 characters each), with the position of the file name in the list defining an index (or file number) into the real or virtual file header table. Thus, in the example shown, file number 1 is that file whose file name occupies bytes 17 to 32 in the file name table. The same file number is used to address more detailed information about that file in the file header table to be described below.

Figure 7:
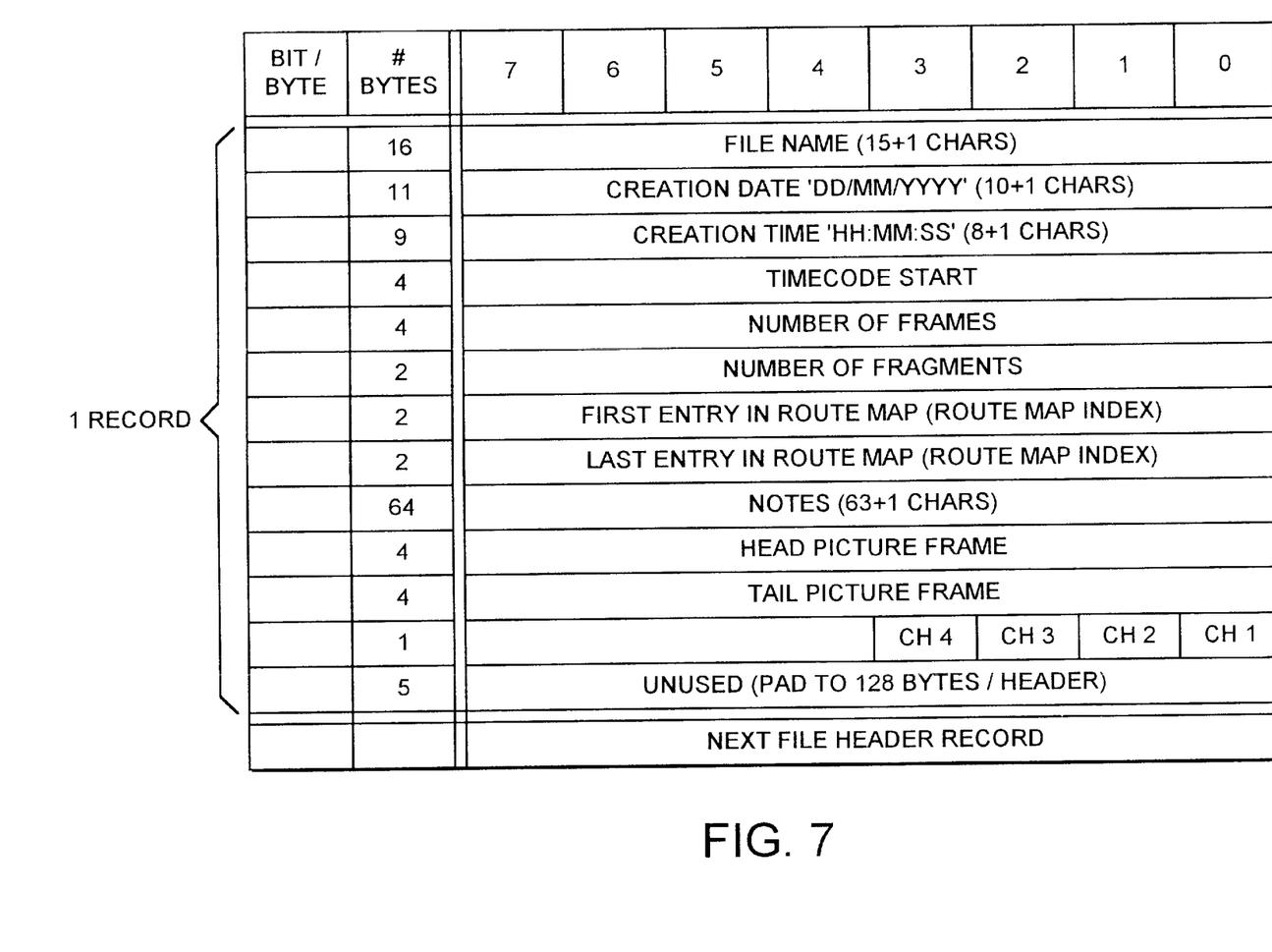
FIG. 7 is a schematic diagram of a real file header table.

FIG. 7 is a schematic diagram of a real file header table. The table contains one record for each possible real file which can be stored on the disk. The file header table entry repeats the file name and defines the creation date and time of that file. There then follows the time code for the first frame in that real file, followed by a number of frames contained in the real file.

The next three entries in the file header table relate to fragmentation of the file on the disk, i.e. the data being split between two or more non-contiguous areas of the disk (in terms of LBAs), and these will be described below with reference to FIG. 9.

A 64-byte space for textual notes is then provided, followed by two records defining a head and a tail picture from the real file. These pictures are used for display on the PC display screen to characterise and identify the real file in an editing operation. Normally, the head picture would be the very first picture in the file, and the tail picture would be the last picture in the file, but these can be set to different pictures within the file if so desired by the user.

One byte is then allocated to indicate which of four possible audio channels are used in that file, and remaining space in the record is unused.

Therefore, although the route map has yet to be described (see FIG. 9 below), it is reiterated at this stage that the real file header table defines the positions on the disk of real data having a permanent association (at least until the file is deleted) with that file name.

Figure 8:
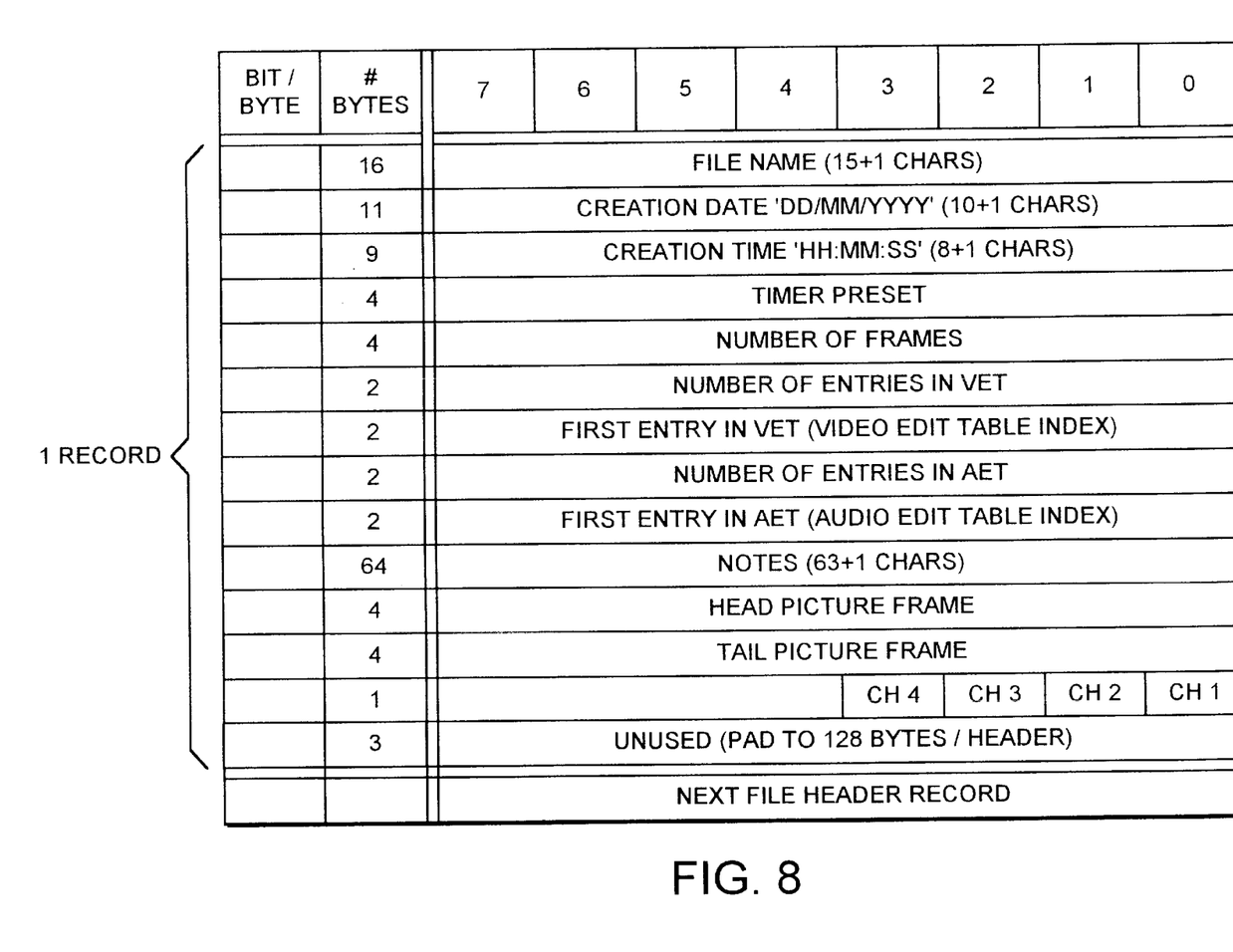
FIG. 8 is a schematic diagram of a virtual file header table.

FIG. 8 is a schematic diagram of a virtual file header. Several entries in the virtual file header table are identical to those in the real file header table, and so will not be described again.

The main differences are that the virtual file header table entry defines the data to be associated with that virtual file by one or more entries in a video edit table index and one or more entries in an audio edit table index. (As a double check, the total number of frames to be expected is defined, and the time code of the output edit sequence can be preset to a particular value by a time preset word).

The video edit table index and the audio edit table index will be described further below, but briefly they comprise a linked list of table entries each defining a portion within a single respective real file. These are created whenever a user gives a PC command to preview an edited output sequence, to mirror the EDL entries held by the PC. A virtual file corresponding to the appropriate VET entries is also set up at that time (i.e. when an output preview command is initiated).

Thus, by the virtual file header table entry pointing to a first entry in the VET and defining a total number of entries in the VET, this provides a linked list of a particular length defining successive portions of one or more real files.

A virtual file can be opened for replay just like a real file can. In that case, the list of VET entries is obtained from the disk medium 160 and the corresponding portions of the route map derived so that those portions can be replayed from the disk medium in order.

Figure 9:
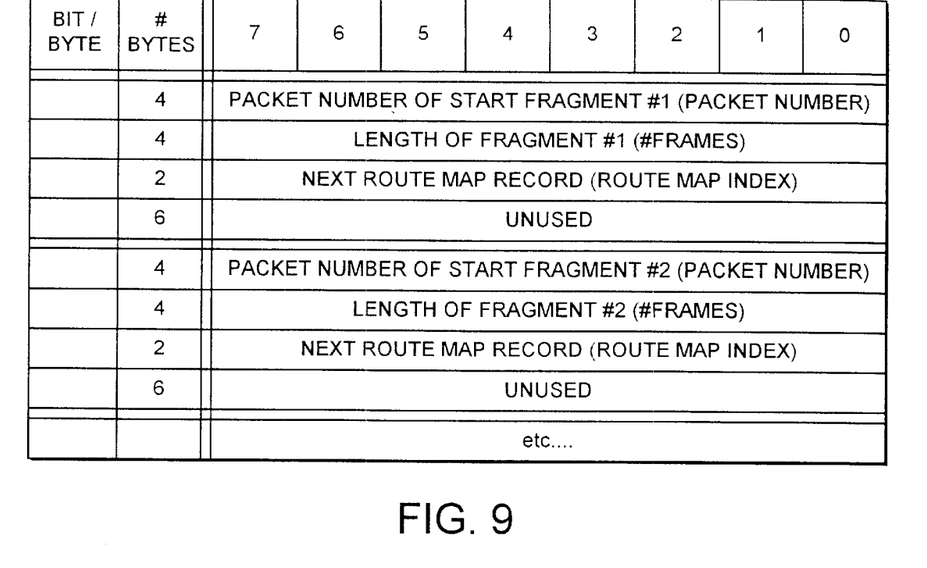
FIG. 9 is a schematic diagram of a disk route map.

FIG. 9 is a schematic diagram of a disk "Route Map".

The Route Map (RM) is a table of records on the disk which are joined together by indexes to form a number of linked lists. Each of these linked lists describes a path or "route" of physical locations on the surface of the media. Each entry in the RM describes a contiguous block of disk sectors or "fragment" and contains the index of another route map record describing the next fragment in a linked sequence. A route is described by starting at one of these fragments and following the chain of Route Map indexes through the Route Map until a record is reached which has a "Next Record" index value of zero to indicate the end of the route. (The first record in the Route Map (index 0) remains unused to allow the index zero to be used to indicate the end of a route).

Each Real File has a route in the RM which describes where on the media surface the file data resides. In addition to a route for each real file, the Route Map contains another route describing the Free Space on the disk. (The Free Space Route). The start of this Free Space Route is indicated by the Start of Free Space index in the disk header which points to an entry in the RM. The Free Space Route is maintained so that at any time it reflects the current allocation of space on the disk.

When a new file is recorded, data writing takes place along the Free Space Route. When recording has completed the route used by the new file is unlinked from the Free Space Route by adjusting the RM indexes. The Start of Free Space index is then made to point further along the free space route, skipping the route used for the new file. The file header created for the new file contains a pointer to the route describing where file data were written. The last of the free space fragments is usually only partially consumed by the new file. In this case a new entry in the RM is created to describe the remainder of this partially used fragment, and this is linked at the top of the Free Space Route.

When real files are deleted, the routes occupied by these files are returned to the free space route by linking at the end of the free space route. It is important that this linking takes place at the end so that fragmentation does not occur until the disk is nearly full. Pointers to the last fragment in each route are maintained so that these items can be quickly accessed without searching through the linked lists for the final record in the chain.

A count of the total number of entries in the RM is maintained in the Number of Fragments on Disk filed in the disk header. This count is also a measure of the extent of fragmentation of the disk.

Figure 10:
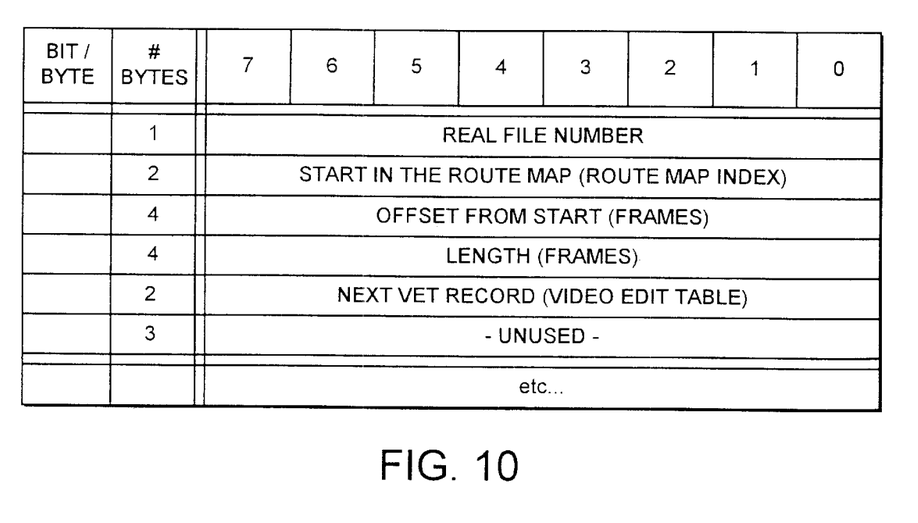
FIG. 10 is a schematic diagram of a video edit table.

FIG. 10 is a schematic diagram of a video edit table (VET).

The VET defines one or more video edit operations, in terms of the information required to identify the real file from which the edited portion comes, and the start and length of the portion of the real file which is required by that editing operation. Each entry also contains an index to the next VET entry for that virtual file.

Rather than defining the start of the edited portion as an offset from the start of the corresponding real file, the VET defines the start with respect to the fragment (or route map entry) in which the edited portion commences. An offset from the start of that fragment is then defined, together with the length of the edited portion in frames. By defining the edited portion in this way, it is not then necessary to refer to the real file header table and to trace through the route map to find the start of that edited portion.

Figure 11:
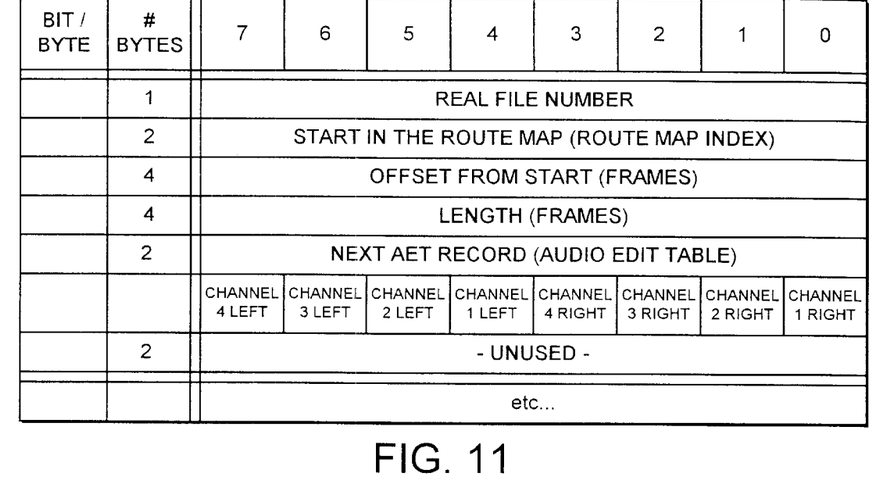
FIG. 11 is a schematic diagram of an audio edit table.

FIG. 11 is a schematic diagram of an audio edit table. This is fundamentally similar to the video edit table described above, except that it contains a byte defining audio channel allocations to the left and right output channels in the output material. Each of the four audio channels (1 . . . 4) can be assigned individually to the left output channel, the right output channel, both output channels or neither output channel by setting the appropriate bits in the allocation byte.

Figure 12A:
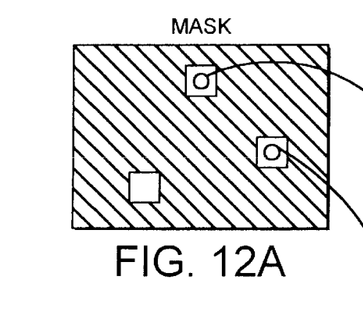
FIGS. 12a and 12b are schematic diagrams illustrating the operation of a used mask.
Figure 12B:
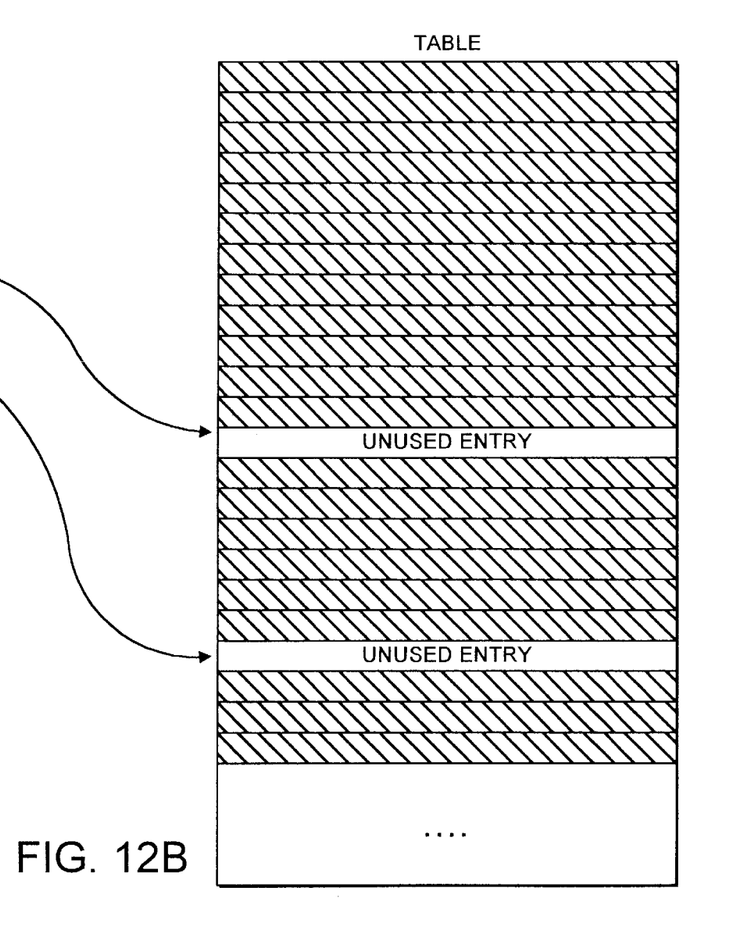

FIGS. 12a and 12b *illustrate the use of a "used" mask.*

Referring back to FIG. 4, these masks are provided in the second, fifth, ninth and eleventh sections of the header area, and are referred to there as the "real file mask", "virtual file mask", "VET mask", and the "AET mask".

Each such mask is a short array of data containing one respective data bit to define whether a corresponding entry in an associated table is currently used or unused. For example, the real file mask contains one bit for every entry in the real file main table; the VET mask contains one bit for every entry in the video edit table; and so on.

As described above, the main tables, header tables and edit tables can be used or become free (by deletion of an entry) in a non-sequential order. The "used" masks are employed to indicate very quickly to the PC which entries in these tables are free when a new entry is required (e.g. when a new real file is to be recorded). The masks are maintained on the disk and also in the PC's memory.

Simply, therefore, when a new entry in the table is required, the first bit in the used mask which is set to zero (indicating "unused") is identified, and the bit position of that bit from the start of the used mask provides an index to the free entry in the corresponding table. When that table entry is then used, the corresponding bit in the used mask is set to logical 1 ("used").

This technique not only saves the time to search through the various tables to seek a free entry, it can also save multiple disk accesses to read the tables (which may be quite lengthy) to search for a free entry.

Figure 13:
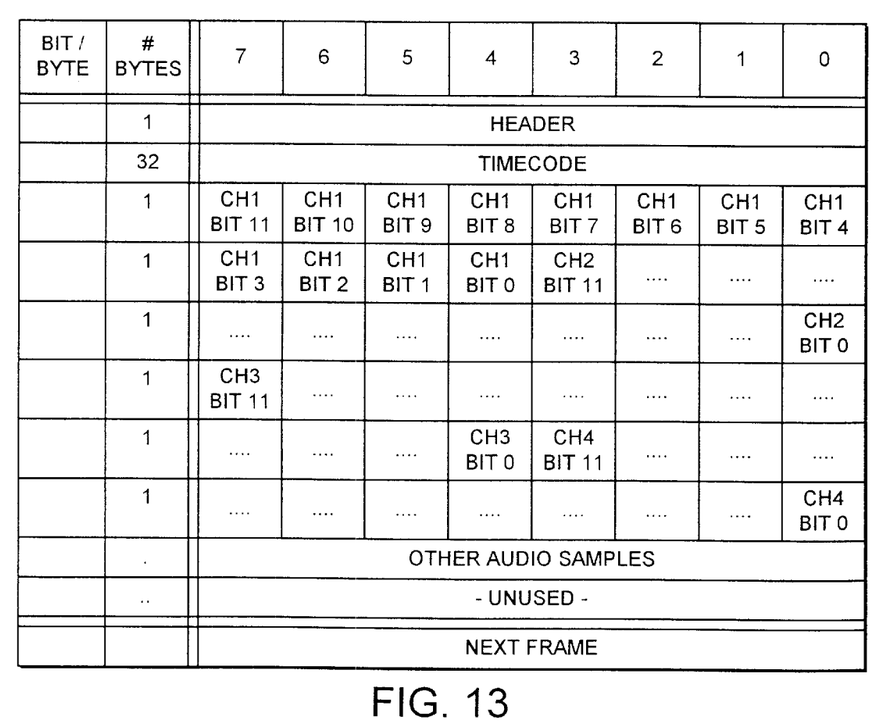
FIG. 13 is a schematic diagram of an audio data packet.

FIG. 13 is a schematic diagram of an audio data packet, which contains the audio data relating to one frame of the corresponding video signal.

The audio data packet defines a header, the time code of the corresponding video frame, followed by the necessary audio samples. The audio data packets have a fixed length (for a particular line standard) so that the position of a particular audio packet with respect to another audio packet in the audio data area can be predicted if the number of offset audio packets from one to another is known.

Figure 14:
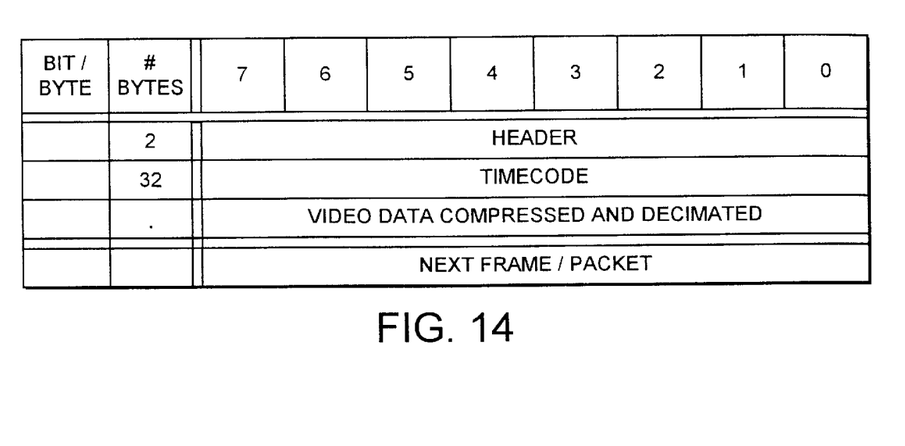
FIG. 14 is a schematic diagram of a video data packet.

Similarly, FIG. 14 schematically illustrates a video data packet which again contains a header, the time code of a single video frame and the video data for that single frame. Again, for a particular video line standard, all of the video packets are of the same length on the disk.

Figure 15:
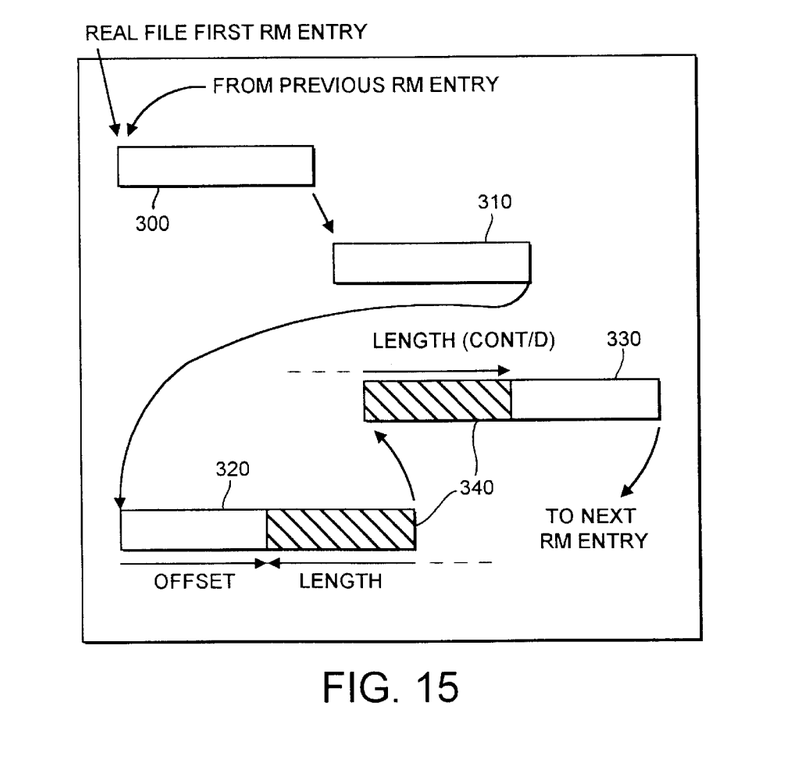
FIG. 15 is a schematic diagram showing the use of the route map and video edit table to define a real file and a virtual file.

Finally, FIG. 15 is a schematic diagram showing the use of the route map and video edit table to define a real file and a virtual file.

FIG. 15 schematically represents the surface of the disk in logical block order from top left to bottom right. Four rectangular sections 300, 310, 320 and 330 represent disk fragments or contiguous data sections on the disk (fragmentation of a real file can occur when a new file is created after previous files have been deleted).

Part sections of the fragments 320 and 330 are deliberately shaded; this will be described further below.

Each fragment 300, 310, 320, 330 corresponds to a single respective entry in the route map. A single route map entry can form part of only one real file, although if a part of fragment is used during creation of a real file, the remaining part is then redefined as a separate, smaller fragment.

The fragments are interlinked by the linked nature of the route map list, where each entry points to the next route map record. Thus, the route map entry corresponding to the fragment 300 contains a pointer to the entry for the fragment 310, which in turn contains a pointer to the entry for the fragment 320 and so on. The entries corresponding to the fragments 300:330 can be in any order on the route map, and in particular do not need to be consecutively indexed entries.

The four fragments shown in FIG. 15 relate to a single real file, and the item entitled "First Entry in Route Map" in the real file header table entry (FIG. 7 above) points to the entry corresponding to the fragment 300.

Thus, when the real file is opened to be replayed, the real file header is loaded from the magneto-optical disk to the PC 100, from which the PC obtains the first entry in the RM (in this example, this points to the fragment 300), the number of entries in the RM or number of fragments (in this example, 4) and the last entry in the RM (in this example, this points to the fragment 340).

To replay the real file, audio and video data frames are read first from the fragment 300. At the end of the fragment 300 the next RM entry (for the fragment 310) in the linked list forming the RM is accessed by using the pointer contained in the RM entry for the fragment 300, and the data for the fragment 310 is replayed. This is followed immediately by the fragment 320 and followed by the fragment 330.

Assuming that this real file contains only four fragments, replay will stop at the end of the fragment 330, because at this point (a) the number of replayed fragments will equal the total number of fragments defined in the real file header; and (b) the "last fragment" pointer will point to the fragment 330. However, it is noted that in the route map, the entry for the fragment 330 will still point to the next route map entry to form a contiguous linked list.

A video edit table entry defines a portion within this real file, in particular a shaded portion 340. Thus, in the VET entry, there will be an index to the route map entry corresponding to the fragment 320, an offset value indicating the offset (in frames) from the start of that fragment and a length value (in frames) giving the total length of the section 340. Thus, to replace that item from the VET, the route map entry for the fragment 320 is accessed, and then replay started at a number (equal to the variable "offset") of frames from the start of that fragment. Replay then continues through the linked list of fragments defined by the route map until the required length (in frames) has been replayed.

To replay a virtual file the list of VET entries is obtained from the disk medium 160 by loading the virtual file header which defines the first VET entry and the number of VET entries. Since the VET is a linked list, where each entry points to a single next entry, the appropriate VET entries for a virtual file can be derived. The route map entries and offsets for each VET entry of the virtual file are then derived (as described above) by the PC and are downloaded to the video store controller to initiate replay from the disk medium.

Similar processing takes place for the audio data using the AET.

So, as far as the video store controller is concerned, it receives an ordered list of LBs on the disk for replay whether the file to be replayed is a real file or a virtual file.

By defining the output edited sequence as a virtual file pointing to linked areas of real data on the disk, replay can be performed in a forwards or reverse direction and at different replay speeds because the whole of the edited output sequence is represented as a single file or a single linked sequence of storage areas. There is no need to open and close individual real files in a particular order to preview the output edited sequence.

Because the virtual files and VET entries are stored on the disk 160, they are retained even at the end of an editing session, and can be opened and replayed during a subsequent use of that disk medium 160 with the editing controller.

The use of the route map also allows a further type of "dummy" file to be created, referred to by the filename "ALL". When this file is opened for replay, the PC simply instructs the video store controller to replay all stored video data on the disk medium, in the order defined by the route map. This allows a user to review the entire contents of a disk medium very easily.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Editing apparatus for editing source video and/or audio material stored on a storage medium to generate an edited material sequence of clips from said source material, said apparatus comprising:
  (i) control logic for defining source files on said storage medium containing data representing said source material to be edited; and
  (ii) control logic for defining an output file on said storage medium for each edited material sequence, each output file comprising addressing information defining a sequence of storage locations on said storage medium of data within the source files representing the one or more clips of source material forming the edited material sequence; wherein,
    a routing table is stored on said storage medium, said routing table being separate from said output file, said routing table having a plurality of entries defining a linked list of storage locations on said storage medium used for storing the source files, and said routing table facilitating replay of said edited material sequence of clips in both forward and reverse directions;
    a separate edit table having a plurality of entries is stored on said storage medium, each entry in said edit table defining storage locations in one of the source files of data representing a contiguous material clip from said source material represented by that source file;
    each output file comprises a file header defining an ordered list of entries in said edit table; and
    each source file comprises a source file header defining a group of successively linked entries in said routing table, said group defining storage locations on said storage medium containing data of that source file.

2. Apparatus according to claim 1, in which said storage medium is a disk storage medium.

3. Apparatus according to claim 1, in which each edit table entry defines a group of successively linked entries in said routing table, said group defining storage locations on said storage medium containing data from a single source file.

4. Apparatus according to claim 1 wherein said routing table further contains a free space route describing free space on the storage medium, said free space route being maintained such that at any time it reflects the current allocation of space on the storage medium, and when a new file is recorded on said storage medium, data writing takes place along the free space route, whereby when recording is completed, the route used by the new file is unlinked from the free space route by adjusting pointers within said routing table.

5. The data storage medium of claim 4 wherein said routing table further contains a free space route describing free space on the storage medium, said free space route being maintained such that at any time it reflects the current allocation of space on the storage medium, and when a new file is recorded on said storage medium, data writing takes place along the free space route, whereby when recording is completed, the route used by the new file is unlinked from the free space route by adjusting pointers within said routing table.

6. A data storage medium for storing source video and/or audio material, edited to form an edited material sequence of clips from said source material, said data storage medium storing:

(i) source files containing data representing said source material to be edited; and (ii) an output file for each edited material sequence, each output file comprising addressing information defining a sequence of storage locations on said storage medium of data within the source files representing the one or more clips of source material forming the edited material sequence;

(iii) a routing table having a plurality of entries defining a linked list of storage locations on said storage medium used for storing the source files, said routing table being separate from said output file, and said routing table facilitating replay of said edited material sequence of clips in both forward and reverse directions; and (iv) a separate edit table having a plurality of entries, each entry in said edit table defining storage locations in one of the source files of data representing a contiguous material clip from said source material represented by that source file; wherein, each output file comprises a file header defining an ordered list of entries in said edit table; and each source file comprises a source file header defining a group of successively linked entries in said routing table, said group defining storage locations on said storage medium containing data of that source file.

* * * * *

UNITED STATES PATENT AND TRADEMARK OFFICE
CERTIFICATE OF CORRECTION

PATENT NO.    : 6,640,044 B2
DATED         : October 28, 2003
INVENTOR(S)   : Greenwood et al.

It is certified that error appears in the above-identified patent and that said Letters Patent is hereby corrected as shown below:

<u>Title page,</u>
Item [30], should read
--      Foreign Application Priority Data
Apr. 12, 1996   (GB) ……………………... 9607693 --.

Signed and Sealed this

Eleventh Day of May, 2004

JON W. DUDAS
*Acting Director of the United States Patent and Trademark Office*